United States Patent [19]
Jensen

[11] Patent Number: 4,836,700
[45] Date of Patent: Jun. 6, 1989

[54] DATA ENTRY SYSTEM

[76] Inventor: Paul S. Jensen, P.O. Box 563, Los Altos, Calif. 94022

[21] Appl. No.: 850,475

[22] Filed: Apr. 10, 1986

Related U.S. Application Data

[63] Continuation of Ser. No. 596,161, Apr. 2, 1984, abandoned.

[51] Int. Cl.$^4$ ............................. B41J 5/10; B41J 5/28
[52] U.S. Cl. ..................................... 400/489; 400/100; 400/486; 400/485; 340/529; 340/309.15; 341/21
[58] Field of Search ................ 400/100; 340/529, 712, 340/825.19, 365 E, 309.15; 364/709

[56] References Cited

U.S. PATENT DOCUMENTS

| | | | |
|---|---|---|---|
| 4,042,777 | 8/1977 | Beqnaert et al. | 400/100 |
| 4,310,254 | 1/1982 | D'Angielillo et al. | 400/486 |
| 4,323,888 | 4/1982 | Cole | 400/368 |
| 4,381,502 | 4/1983 | Prame | 400/100 |
| 4,443,789 | 4/1984 | Endfield et al. | 400/479 |
| 4,463,348 | 7/1984 | Sidebottom | 340/529 |
| 4,467,321 | 8/1984 | Volnak | 340/365 R |
| 4,520,351 | 5/1985 | Altman et al. | 340/309.15 |
| 4,540,984 | 9/1985 | Waldman | 340/309.15 |
| 4,638,306 | 1/1987 | Rollhaus et al. | 400/100 |

FOREIGN PATENT DOCUMENTS

| | | | |
|---|---|---|---|
| 97816 | 1/1984 | European Pat. Off. | 400/365 |
| 38687 | 4/1981 | Japan | 400/253 |
| 2064187 | 6/1981 | United Kingdom | 400/100 |

OTHER PUBLICATIONS

Leimer, "Multiple Repeat Rate . . . ", IBM Technical Disclosure Bulletin, vol. 23, No. 2, p. 770, 7/80.
Bushmiaer et al., "Repeat Mechanism . . . ", IBM Technical Disclosure Bulletin, vol. 21, No. 5, pp. 1940–1941, 10/78.

Primary Examiner—William Pieprz

[57] ABSTRACT

A data entry system comprising a one-handed keyboard having five data keys and five control keys which are used in combinations for entering data and control characters in the system. The system also comprises a cursor control assembly for controlling a cursor on a screen and controls for permitting a single keyboard to be operated with either the left or right hand.

7 Claims, 6 Drawing Sheets

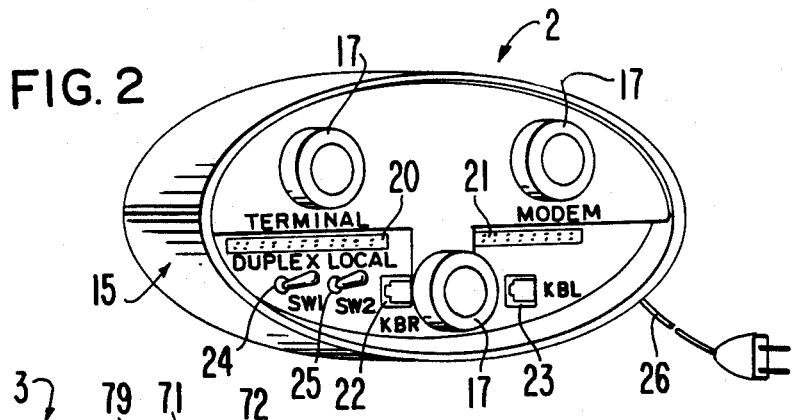
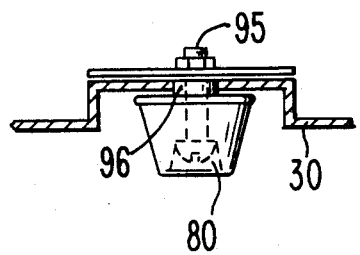
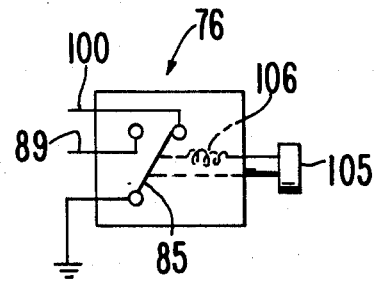
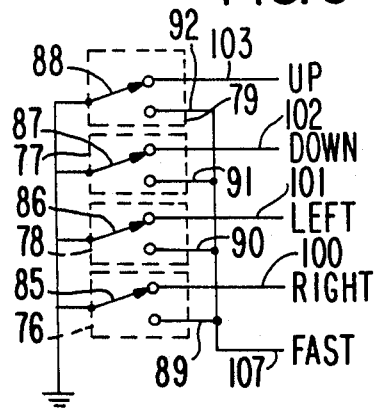

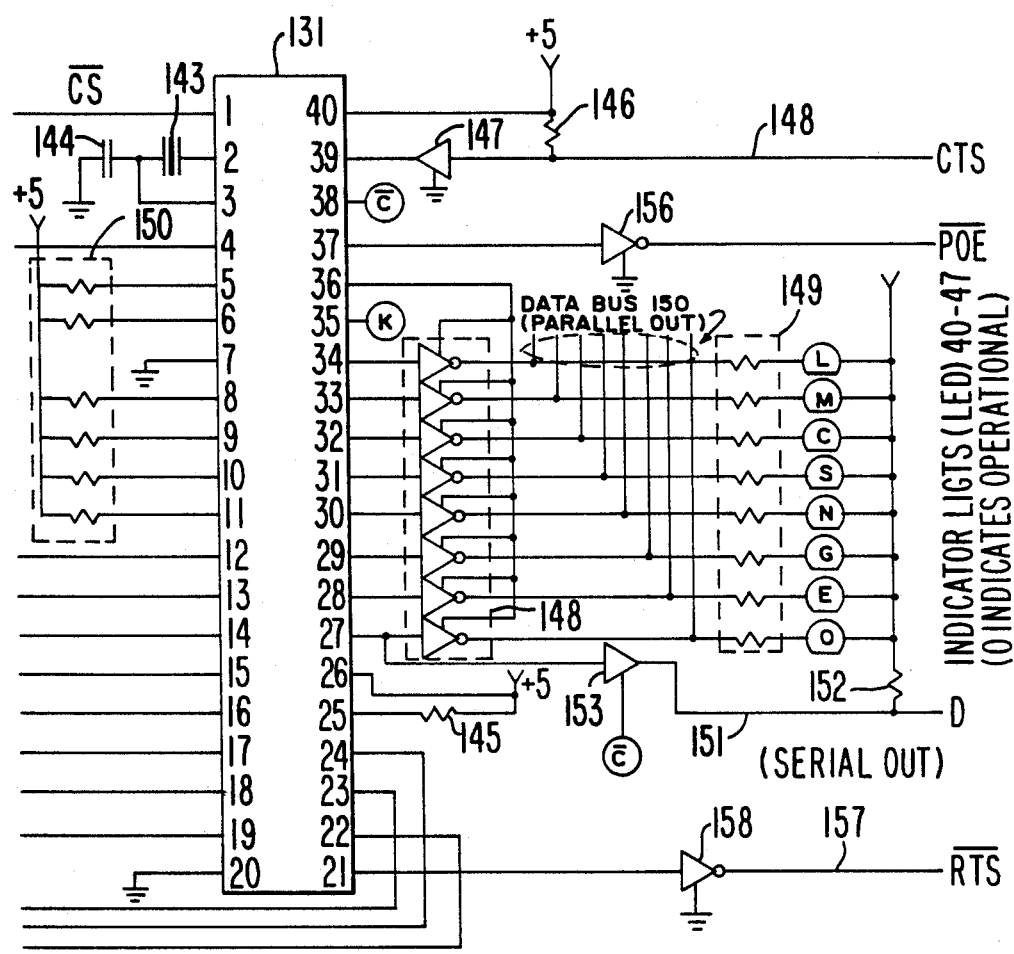

RIGHT HAND MODE

LEFT HAND MODE

DATA ENTRY SYSTEM

This is a continuation of Ser. No. 596,161, filed Apr. 2, 1984, now abandoned.

FIELD OF THE INVENTION

The present invention relates in general to data entry systems and in particular to a data entry system comprising a one-handed keyboard wherein data and control characters are entered by simultaneously depressing a plurality of keys on the keyboard. Such a system is descriptively called a chord data entry system.

BACKGROUND OF THE INVENTION

The keyboard most commonly used today is called the QWERTY keyboard. This name is chosen in recognition of the characters which comprise the first six alphabetic characters on the left end of the second from the top row of characters on the keyboard.

The QWERTY keyboard was developed in 1867 by Christopher Sholes, Carlos Glidden and Samuel Soule for the first known practical typewriter. The layout was patented by Christopher Sholes in 1878. Because of the mechanical complexity of that early typewriter, the keyboard was specifically arranged to prevent fast typing, which would jam the machine.

Although this awkward arrangement still persists as the norm, several studies on alternative keyboards have been made. August Dvorak, in U.S. Pat. No. 2,040,248, granted in 1936, disclosed an alternative arrangement for the characters used on the QWERTY keyboard, but kept the same physical key organization. After numerous tests, it was determined that the average horizontal distance traveled by a typist's fingers using the Dvorak keyboard was substantially reduced and that the typing workload was more evenly distributed among the typist's fingers. As a consequence of these discoveries, the Dvorak keyboard has now been adopted as a standard alternative keyboard, ANSI X4.22-1983.

Another alternative keyboard, called the Maltron keyboard, was patented by Lillian Malt in 1981 in U.S. Pat. No. 4,244,659. The Maltron keyboard involves not only a new arrangement of the letters but also a new physical arrangement of the keys. This keyboard promises to even further reduce the horizontal travel of a typist's fingers.

Still another type of keyboard which has been evolving recently is a keyboard which uses combinations of keys to type characters. Since it is possible to create 31 different combinations using 5 fingers, one can consequently type all 26 letters of the alphabet together with five punctuation marks without any horizontal movement of the hand.

Two previous efforts aimed at one-handed keyboards are known. The Writehander TM, developed and marketed by the NewO Company of Palo Alto, Calif. in the late 1970's, consisted of a hemispherically-shaped dome with twelve keys arranged around it. While reducing finger and hand movement, some persons have found the device very awkward to use.

A second device, called the Microwriter TM, is currently being offered by the Microwriter Co., 17 East 71st Street, New York, NY 10021. The Microwriter has six keys arranged on a small surface shaped to comfortably support a hand. The key combination used for each letter is intended to resemble the physical appearance of the letter in order to be more easily remembered.

Heretofore, the great potential for one-handed keyboards had not been realized. Prior known one-handed keyboards have been at a disadvantage in three ways. First, they have failed to achieve the increased typing speed inherently possible as a result of reduced horizontal hand movement. Second, they are generally not usable to both left and right handed people and last, they have not incorporated the graphic "mouse" which is widely used for interactive work with computing equipment.

SUMMARY OF THE INVENTION

In view of the foregoing, a principle object of the present invention is a novel data entry system comprising a one-handed keyboard. The entry of data and control characters by means of the keyboard is generally accomplished by simultaneously depressing predetermined combinations of keys. For convenience, each such combination of keys is called a chord and the entire system is descriptively called the chord data entry system.

The chord data entry system, collectively referred to as CHORD, consists of computer hardware and firmware designed to permit data input to computing machinery by means of the one-handed keyboard. The CHORD is designed to interface with any computing equipment utilizing standard RS232-C serial data interface ports. Such equipment includes terminals, microcomputers, personal computers and display devices using a data terminal equipment (DTE) RS232-C port. It also includes host computers and modems using a data communication equipment (DCE) RS232-C port.

Specifically, the CHORD hardware consists of two unique modules housed in attractive cases suitable for display on a user's desk or table. One module, called the data exchange module (DEM), houses the power supply and provides all of the sockets needed for connections to other equipment. The other module is the keyboard, a small ten key device for general data entry. The keyboard is designed to be operated by either hand individually, incorporating both left-hand and right-hand operational modes. One or two (one for each hand) keyboards may be connected to one DEM.

The DEM is housed in a cylindrical case having an elliptical cross-section. The top of the case consists of a flat surface pitched at a 72 degree angle to the centerline of the cylindrical case. Rubber feet are mounted on the base of the DEM to raise it sufficiently high above a table top to permit several connection cables to pass under the edge of the case. A lighted power-on switch is mounted on the outside cylindrical surface of the DEM case.

Under the DEM housing there is provided an open space wherein are mounted two RS232-C sockets for connecting to the DEM a terminal and/or a modem, two sockets for connecting right and left hand keyboards, a 120 volt AC power cord and two toggle switches. The open area is of sufficient size to accommodate suitable plugs inserted into said sockets. The switches provide a means for adjusting the internal operation of the DEM. One can adjust for half or full duplex operation and operation with or without a modem or terminal.

Internally, the DEM houses a three voltage power supply (+5 v, +/−12 v) and suitable exchange circuitry to route data among the several hardware modules that may be connected to it, e.g. terminal, modem and keyboards. The exchange circuitry includes arbitration facilities to handle collision situations in which data arrives from two or more sources at the same time. For example, data arriving from: (1) the right keyboard, (2) the left keyboard, and/or (3) the terminal equipment may potentially collide. The arbitration circuit assigns priority to the keyboards and the terminal in the order given, i.e., data from the right keyboard supersedes (and blocks) data from the left keyboard and the terminal equipment. Similarly, if data transmission from the left keyboard and the terminal are attempted simultaneously, the left keyboard takes precedence over the terminal.

The keyboard of the CHORD utilizes ten keys on a small device that can be either hand-held or situated on a table top. The keys are symmetrically placed so that the keyboard can be conveniently operated by either hand. Because of this symmetry and the fact that the keyboard functions in either a left-hand or a right-hand mode, the same finger-to-character relationship is preserved for either hand.

The key combination used for each character has been carefully chosen for maximum typing efficiency. This selection is the result of extensive analysis of English text and results not only in virtual elimination of horizontal movement by the typist's fingers, but also in a reduction in the number of key strokes required for common text. As used herein, a stroke is defined as a single movement in one direction, down or up, by one key or a set of keys operated simultaneously. This definition of stroke relates both to the movement of keys and to the operation of keyboards in a natural way. Each movement of a key (or several keys simultaneously) is a temporal event contributing to data entry. For conventional keyboard, two strokes—down and up—are typically required for each character typed. These two strokes are distinct temporal events similar to strokes of a clock.

For the keyboard of the present invention, there are many circumstances in which fewer than two strokes (temporal events) are required to type characters. Referring to the numbered keys shown in FIG. 14 and described on page 31 below, consider the following sequence of strokes:

| Stroke | Action | Effect |
| --- | --- | --- |
| 1 | Press key 3 | Enter letter t |
| 2 | Press key 2 (key 3 remaining down) | Enter letter h |
| 3 | Release key 3 (key 2 remaining down) | Enter letter e |
| 4 | Release key 2 | Sequence complete |

The above example presents a three character sequence that can be entered with four strokes; i.e. 1.33 strokes per character in contrast with 2 strokes per character required by other keyboards. By design, entry of most common letter and number sequences requires fewer than two strokes per character using the present invention.

Note that an operator must adhere to some timing constraints when using the CHORD keyboard. In the above example, if stroke 2 had followed stroke 1 almost immediately, e.g. within 20 milli-seconds, then stroke 1, would not have been recognized as an independent stroke and stroke 2 would have been recognized as comprising the simultaneous depression of both keys 3 and 2. The entry would have been interpreted as h instead of th. The design of the CHORD provides as much tolerance in the timing as possible, consistent with efficient operation, and facilitates timing adjustments by the operator to suit his individual preferences.

Another unique feature of the present invention, is that it has incorporated a cursor-control mechanism which allows it to function similarly to a conventional graphics mouse.

Specifically the keyboard is housed in a free-form case of generally elliptical cross-section. The top surface consists of a dome-shaped area connected to a flat area through a smooth transition. These two areas are surrounded by a sharp wedge-shaped vertically rising wall that is of small width near the dome and increasingly larger width near the flat area. The ten keys are situated on the flat area and eight indicator lights are positioned in the wedge-shaped wall. The keyboard rests on four rubber feet that are mounted in circular recesses in the bottom of the case. In addition, there are eight switches exposed on the bottom of the housing that are used to adjust the internal operation for any of several installation options permitted. These switches are used to set default operating conditions of the system. A cord is also provided which extends from the front of the housing and is suitable for connection to the DEM.

On top of the keyboard there are five data keys, numbered 1 through 5, and five control keys, designated by the letters N,S,B,R, and C. The interpretation of the letters on the control keys is as follows:

N—Numeric shift (alphabetic to numeric and back)
S—Alphabetic shift (lower case to upper case and back)
C—ontrol shift (activate or deactivate control function)
B—Blank space key (transmits data)
R—Carriage Return (transmits data)

Numbers, letters and other keyed data are normally entered by pressing combinations of the data keys simultaneously. Here, the word simultaneous means "within a very short time span." The duration of that time span is typically about 40 ms; however, it may be altered by a user to suit his or her abilities.

There are two general classes of operations carried out on the control keys. The control-state operations change the operating characteristics of the keyboard and the control-transmit operations generate data.

The control-state operations further divide into two types: two-state toggle and three-state toggle operations.

For each two-state toggle operation, two keyboard states are associated with a repetitive depressing of a particular control key combination. If the keyboard is in a first state, pressing the associated combination of control keys toggles it to a second state. A subsequent depressing of the associated combination of control keys toggles the keyboard back to the first state. For example, if the keyboard is transmitting data using odd parity (a first state), pressing the combination of control keys N and R simultaneously will cause the keyboard to transmit data using even parity (a second state). Pressing the control key combination N and R once more will cause the keyboard to once again transmit data using odd parity (the first state).

Similarly, for each three-state toggle operation, three keyboard states are associated with a repetitive depressing of a particular control key. In this implementation, the three-state toggle operation is associated with the individual keys S (shift alphabetic), N (numeric shift), and C (control shift). Although the three-state toggle operation is associated with individual control keys in this implementation, it obviously may be associated with specific control key combinations without material change to the innovation. Repeatedly pressing a three-state control key causes the keyboard state to cycle from a first to a second to a third and back to the first state. However, whenever the keyboard is in the second state of a three-state operation, pressing any combination of data keys will cause: (1) data to be entered and (2) the keyboard state to automatically revert from the second state to the first of the three states.

The three-state toggle operations correspond to the shift and shift-lock operations of a standard typewriter. For example, disregarding the states associated with the keys N and C, the control key S controls the following states:

S1. Lower-case letters are transmitted by data keys
S2. After one upper-case letter is transmitted by data keys, the keyboard reverts to state S1
S3. Upper-case letters are transmitted by data keys If the keyboard is in state S1, depressing the S key will put it in state S2. Immediately depressing the S key again will put the keyboard in state S3. When the S key is depressed once more, the keyboard reverts to state S1.

The control key N controls the following states:
N1. Upper or lower case letters are transmitted depending on the state associated with control key S
N2. After one number is transmitted by the data keys, the keyboard reverts to state N1
N3. Numbers are transmitted by data keys.

If the keyboard is in state N1, depressing the N key will put it in state N2. Depressing the N key again, before depressing a data key, will put the keyboard in state N3. When the N key is depressed once more, the keyboard reverts to state N1.

The control key C controls the following states:
C1. Alphabetic or numeric characters are transmitted depending on the state associated with control keys N and S
C2. After one special control character is transmitted, the keyboard reverts to state C1
C3. Special control characters are transmitted by depressing the data keys.

If the keyboard is in state C1, depressing the C key will put it in state C2. Depressing the C key again, before depressing a data key, will put the keyboard in state C3. When the C key is depressed once again, the keyboard reverts to state C1.

From the foregoing, it is apparent that there are 27 possible combined-shift states, e.g. S1-N1-C1 for transmitting lower case alphabetic characters, S1-N2-C1 for transmitting one numeric character followed by lower case alphabetic characters, etc.

Three of the indicator lights, situated in the wedge-shaped wall above the keys, are labeled N, S, and C and correspond to the shift keys N, S, and C. Each of the indicator lights is on whenever the corresponding shift state is in state 2 or state 3.

The interpretation of the data keys for transmitting information depends upon the combined-shift-state of the keyboard. However, the interpretation for state 2 is the same as that for state 3, but, pertains to only one character. Thus, only 8 out of the 27 combined-shift-states determine unique data key interpretations.

Two of the two-state toggle control-state operations, i.e. control key combinations SRC and NSR, facilitate inspection and modification of keyboard operational parameters such as, for example, the rate at which data is transmitted by the keyboard, e.g. 300 baud, 1200 baud, 9600 baud, etc. Control key pattern SRC toggles the keyboard between normal and display states. In the display state, the operator enters two zeros and two hexadecimal numbers (on the data keys) indicating which parameter is to be displayed. He then presses carriage return and the desired parameter value appears in the eight indicator lights in binary form. For example, if the operator wishes to inspect the baud rate, he or she depresses the key combination SRC and inserts the location 36. On depressing the carriage return key R, the parameter for the current baud rate is displayed.

Control key pattern NSR toggles the keyboard between normal and modify states. In the modify state (light M on), the operator enters two hexadecimal numbers indicating which parameter is to be modified followed by the parameter value (also two hexadecimal numbers). For example, if the baud rate is to be changed, the operator depresses the control key combination NSR and inserts the value of the desired baud rate parameter. After the value is entered, the keyboard automatically reverts to normal state. Note that during inspection and modification, no data are transmitted to the DEM.

Among the parameters that can be inspected and modified are nine data characters, corresponding to control-transmit patterns. The control-transmit operations are similar to programmable function key operators on standard keyboards.

Referring to the cursor control function of the keyboard, i.e. the graphic control function, the keyboard has internal sensors that can detect the magnitude and direction of horizontal pressure applied to the keyboard housing. In the graphics mode of operation, the keyboard electronics translates such pressure into ASCII character sequences which cause cursor movement on computing terminal equipment when transmitted. The keyboard transmits such character sequences at a rate proportional to the magnitude of the applied pressure, thereby affecting the rate of cursor movement.

BRIEF DESCRIPTION OF THE DRAWING

The above and other objects, features and advantages of the present invention will become apparent from the following detailed description of the accompanying drawing in which:

FIG. 2 is a perspective view of the base of the data exchange module of FIG. 1.

FIG. 3 is a partial cut-away view of a cursor control assembly according to the present invention.

FIG. 4 is a partial side view of the foot assembly of FIG. 3.

FIG. 5 is an enlarged view of one of the switch members of FIG. 3.

FIG. 6. is a schematic diagram of a switch circuit according to the present invention.

DETAILED DESCRIPTION OF THE DRAWING

Figure 1:
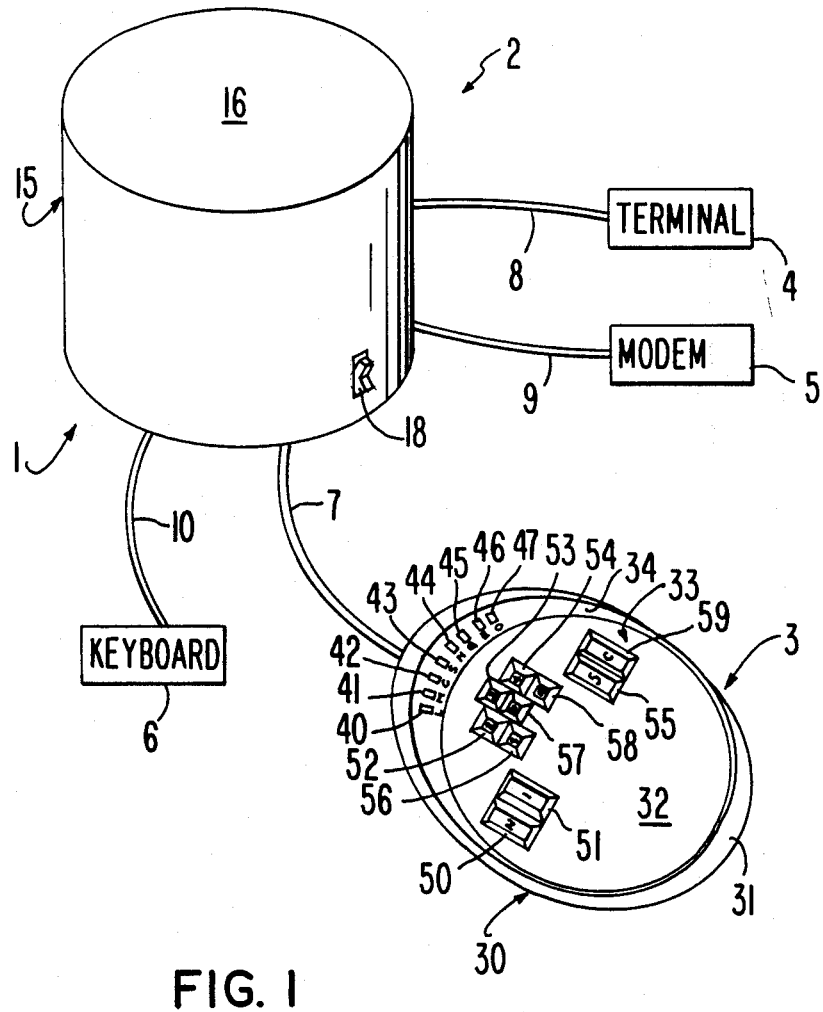
FIG. 1 is a perspective view of a data entry system according to the present invention.
Figure 7:
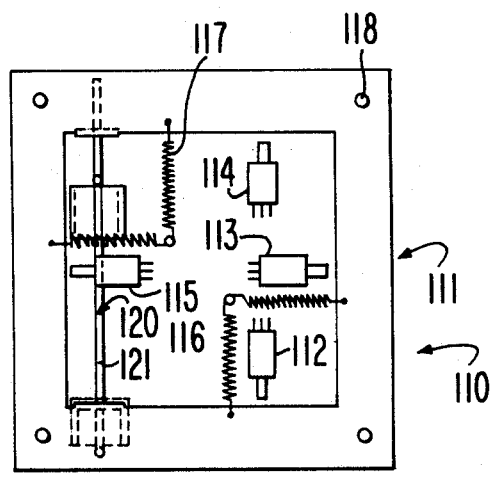
FIG. 7 is a partial cut-away view of an alternative cursor control assembly according to the present invention.
Figure 10:
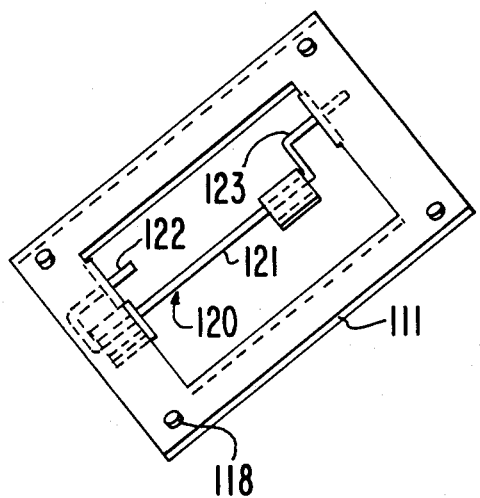
FIG. 10 is a perspective of the assembly of FIG. 7.
Figure 8:
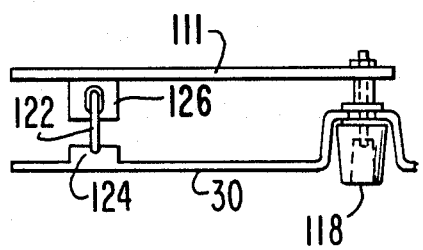
FIG. 8 is an end view of the assembly of FIG. 7.
Figure 9:
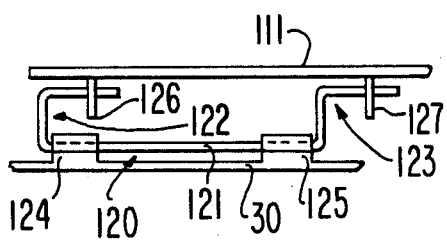
FIG. 9 is a side view of the assembly of FIG. 7.

Referring to FIGS. 1 and 2, there is provided in accordance with the present invention a data entry system designated generally as 1. In the system 1, there is provided a data exchange module (DEM) designated generally as 2, a keyboard designated generally as 3 and either a data terminal 4 or a modem 5 or both. In addition to the above described apparatus, there may also be provided an optional keyboard 6. The keyboard 3, terminal 4, modem 5 and keyboard 6 are connected to the DEM 2 by means of cables 7,8,9, and 10, respectively.

In the DEM 2, there is provided an elliptical housing 15. The top of the housing 15 comprises a flat surface 16 which is pitched at a 72 degree angle to the centerline of the housing 15. Mounted to the base of the DEM 2, there is provided a plurality of rubber feet 17. The feet 17 are provided to raise the DEM 2 sufficiently high above a table top on which it rests to permit cables 7–10 to pass under the edge of the housing 15. In the lower front surface of the housing 15, there is provided a lighted on/off AC power switch 18.

In an open space provided therefore in the base of the DEM 2, there are provided two RS232-C sockets 20,21, two keyboard sockets 22,23, two toggle switches 24,25 and a 120 volt AVC power cord 26. The sockets 20,21 are provided for connecting the cables 8,9 of the terminal 4 and modem 5 to the DEM 2, respectively. The sockets 22,23 are provided for connecting the cables 7,10 of the keyboards 3 and 6 to the DEM 2, respectively. The switches 24,25 are provided for changing modes of operation of the DEM 2 as will be described in detail below. The power cord 26 is provided for conveying power to the DEM 2.

In the keyboard 3, there is provided an oval or elliptically-shaped housing 30 having a generally curved sidewall 31, a domed palm supporting surface 32, and a relatively flat key section 33. Extending upwardly from the forward edge of the section 33, there is provided a sloping wedge-shaped wall 34. The wall 34 is highest at its center and is uniformly tapered as it extends rearwardly toward the forward lateral edges of the palm supporting surface 32. Centrally located in the wall 34, there is provided a plurality of indicator lights 40–47 which are designated in accordance with their intended function as L,M,C,S,N,G,E and O, respectively. Located in and projecting from the surface of the key section 33, there is provided a plurality of data keys 51–55 designated as 1,2,3,4, and 5, respectively, and a plurality of control keys 50,56,57,58 and 59 designated in accordance with their function as N,S,B,R, and C, respectively.

Figure 14:
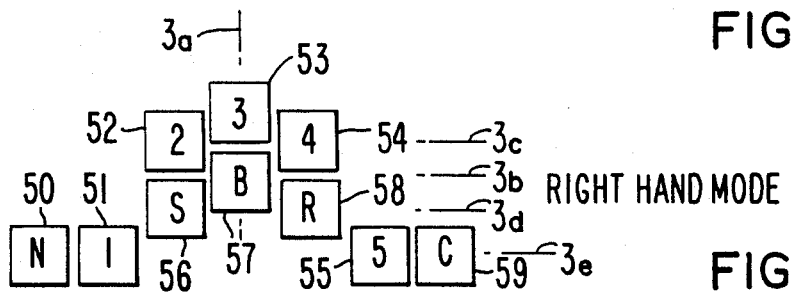
FIG. 14 is a diagram of the data and control key positions for the right-hand mode.

Referring to FIG. 14, the keyboard 3 comprises a longitudinal axis 3a which extends through the keys 3 and B and a transverse axis 3b which extends through the key B. The remaining keys are symmetrically located about the longitudinal axis 3a on three axes 3c, 3d and 3e which extend parallel to the transverse axis 3b. Keys 2 and 4 are located on axis 3c which extends above the transverse axis 3b approximately between keys 3 and B. Keys S and R are located on axis 3d which extends below key B and Keys N, 1, 5 and C are located on axis 3e which extends below keys S and R.

Figure 15:
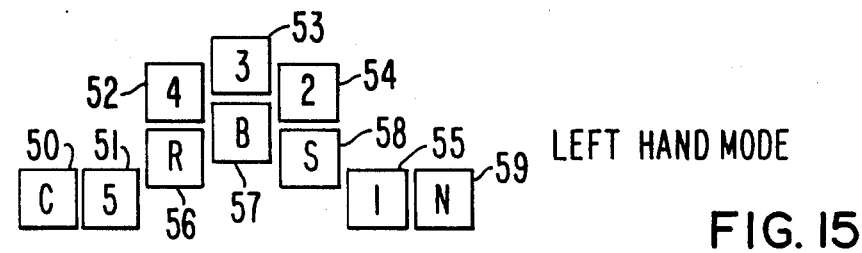
FIG. 15 is a diagram of the data and control key positions for the left-hand mode.

As shown in FIG. 14, the designation above for the keys 50–59 is for a keyboard which is being operated in a right-handed mode. As seen in FIG. 15, when the keyboard is being operated in a left-handed mode, the designation of the keys is the mirror image of that given above for operation in the right-handed mode.

Figure 11A:
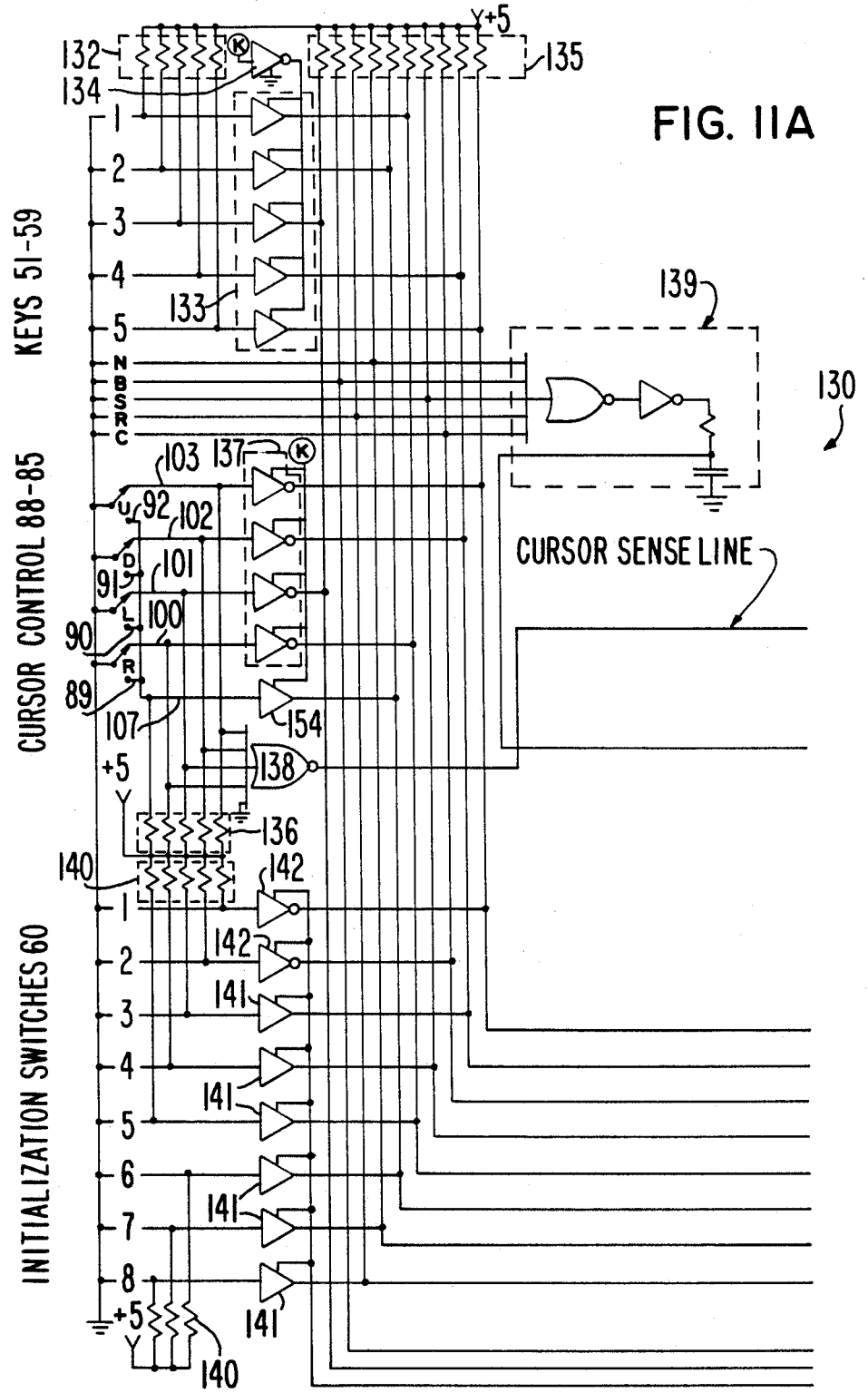
FIG. 11 is a schematic diagram of a data and control character generating circuit according to the present invention.

In addition to the above described features of the keyboard 3, there is also provided in the base of the keyboard 3, a plurality or initialization or default switches 60, not shown in FIGS. 1 and 2, but, identified in FIG. 11 as switches 1–8.

Referring to FIGS. 3–6, there is further provided in the base of the keyboard 3, a graphics or cursor control assembly designated generally as 70. In the assembly 70, there is provided an annular slip member 71, a plurality of return spring members 72–75, a plurality of identical double-throw, single-pole momentary switch members 76–79 and a plurality of rubber foot members 80–83.

The switches 76–79 are attached to the housing 30 at mutually perpendicular points and comprise poles 85–88, first contacts 100–103 and second contacts 89–92, respectively. As seen more clearly in FIG. 5 which shows an enlarged view of the switch member 76, each of the poles 85–88 of the switch members 76–79 is mechanically connected to a plunger 105 and a spring member 106. The ends of each of the spring members 72–75 are connected to the slip member 71 at mutually perpendicular points on the slip member 71 and the midpoints of each of the spring members 72–75 are connected to the housing 30 between the switch members 76–79.

As shown more clearly in FIG. 4, the foot members 80–83 are attached to the slip member 71 at mutually perpendicular points on the slip member 71 by means of a feed-through fitting 95 and project through holes provided therefore in the housing 30. An optional foam washer 96 is provided for closing the clearance space between the fitting 95 and the edge of the hole through which the foot members project.

As shown more clearly in FIG. 6, the poles 85–88 of switches 76–79 are coupled in parallel to ground, the second contacts 89–92 are coupled in parallel to a FAST control line 107 and the first contacts 100–103 are connected to RIGHT, LEFT, DOWN and UP control lines 100–103, respectively.

Referring to FIGS. 7–10, there is provided in an alternative cursor control assembly designated generally as 110, a rectangularly-shaped slip member 111, a plurality of switches 112–115, a plurality of centering spring members 116,117, a plurality of foot members 118 and an antirotation bar assembly 120. The switches 112–115, the foot members and their means for attachment to the slip member 111 and the spring members 116,117 are similar to the switches 76–79, foot members 80, foot member attaching means, and spring members 72–75 of FIG. 3.

In the bar assembly 120, there is provided an elongated bar member 121. Extending from each end of the bar member 121, there is provided an L-shaped bar member 122,123. The opposite ends of the bar member 121 are pivotally attached to the housing 30 by means of a pair of fittings 124,125. The free ends of the bar members 122,123 are movably linked to opposite sides of the slip member 111 by means of a pair of slotted fittings 126,127. The linking of the free ends of the bar members 122,123 in the fittings 126,127 permits them to both pivot and slip in the fittings.

Referring to FIG. 11, there is further provided in the keyboard 3 an electronic data and control character generating circuit designated generally as 130. In circuit 130, there is provided a 40 pin integrated circuit module 131. Module 131 comprises an INTEL 8048 programmable microprocessor designed by INTEL, CORP. of Santa Clara, Calif. As see in FIG. 11, each of the data keys 51–55, designated therein as keys 1–5, respectively, are coupled to a +5 volt supply through a 2.2K ohm resistor network 132 and through a 74LS125 QUAD 3-state buffer network 133 to pins 16,17,24,13 and 12 of module 131, respectively. The buffers 133 are controlled through a 74LS368A 3-state inverter buffer 134, which is controlled by a K control signal from pin 35 of the module 131. The control keys 50,57,56,58,59, designated in FIG. 11 as keys N, B, S, R, C, respectively, are connected to pins 18,23,15,19, and 14 of module 131, respectively, and through an OR circuit 139, which provides a hard reset control signal to pin 4 of the module 131. Pins 12–19, 23 and 24 are also connected to a +5 volt supply through a 2.2K ohm resistor network 135.

The UP, DOWN, LEFT, and RIGHT control signals on lines 103,102,101 and 100 are coupled to a +5 volt supply through a 2.2K ohm resistor network 136 and through a 74LS368A 3-state invert buffer network 137 to pins 12,13,24 and 16 of the module 131 and to pin 1 of module 131 through a NOR circuit 138. The FAST control signal on line 107 is coupled to a +5 volt supply though resistor network 136 and through a 74LS267A 3-state buffer 154 to pin 17 of module 131. The buffers 137 and 154 are controlled by the K control signal from the pin 35 of the module 131.

One side of each of the initialization switches 60 is coupled in parallel to ground while the opposite sides are connected to a +5 volt supply through a 2.2k ohm resistor network 140. Switches 1 and 2 are connected to pins 12 and 14 of module 131 through a 74LS268A 3-state inverter buffer 142. Switches 3 through 8 are connected to pins 13, and 15–19 of module 131 through a 74LS367A 3-statebuffer 141. The buffers 141 and 142 are controlled by an initialization control signal from pin 22 of module 131.

Pins 5,6, and 8–11 of the module 131 are coupled to a +5 volt supply through a 2.2K ohm resistor network 150, pins 7,20 are coupled to ground and pins 2,3 are coupled through a 3.458 megahertz crystal 143 with a 10 pf capacitor 144 to ground. Pins 26 and 40 are coupled to a +5 volt supply and pin 25 coupled to the supply through a 2.2K ohm resistor 145. The only other input line to the module 131 is a CLEAR-TO-SEND signal line 148 which is coupled to a +5 volt supply through a 2.2K ohm resistor 146 and through a 74LS125 3-state buffer 147 to pin 39 thereof for providing a CLEAR-TO-SEND signal (CTS) to the module 131.

One side of the indicator lights 40–47, which are designated, respectively L, M, S, C, N, G, E, and O in FIG. 11, are coupled to pins 34–27, respectively, of the module 131 through a 74LS368A 3-state inverter buffer network 148 and a 0.33K ohm resistor network 149. The other side of the lights 40–47 are coupled in parallel to a +5 volt supply. The outputs of the buffers 148 are also coupled to a parallel data bus 150 for providing a parallel data output to other apparatus, not shown. The state of buffers 148 is controlled by a signal from pin 36 of module 131.

Data and control characters are provided serially by the module 131 on a data line 141. The data line 151 is coupled to a +5 volt supply through a 4.7K ohm resistor 152 and to pin 27 of the module 131 through a 74LS125 3-state buffer 153. Buffer 153 is controlled by a signal C from pin 38 of module 131.

A parallel output enable signal POE is provide by pin 37 of the module 131 through a 74LS368A 3-state inverter buffer 156. A REQUEST-TO-SEND signal (RTS) is provided by module 131 on a line 157 which is coupled to pin 21 of the module 131 through a 74LS368A 3-state inverter buffer 158. The control inputs of the buffers 147,156 and 158 are coupled to ground.

Figure 12:
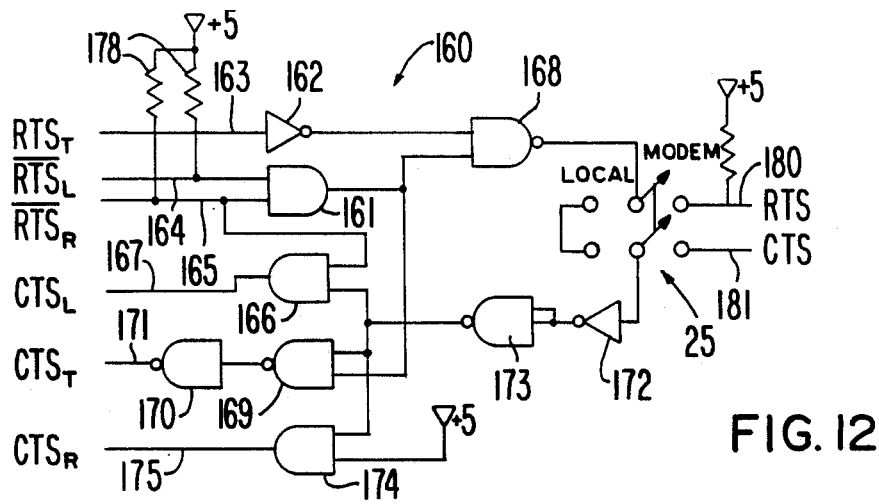
FIG. 12 is a schematic diagram of a data flow path control circuit according to the present invention.

Referring to FIG. 12, there is provided a logic circuit designated generally as 160. In the circuit 160, there is provided an AND gate 161 and an inverting line receiver 162. The input to the line receiver 162 is coupled to a control line 163 for receiving from a data terminal attached thereto, a REQUEST-TO-SEND ($RTS_T$) signal. The inputs of the AND gate 161 are coupled to a +5 volt supply through a 4.7K ohm resistor 178 and to a pair of control lines 164,165 for receiving from a left and a right hand keyboard attached thereto, a REQUEST-TO-SEND ($RTS_L$) signal from the left-hand keyboard and a REQUEST-TO-SEND ($RTS_R$) signal from the right-hand keyboard. The lines 164,165 correspond to the line 157 of FIG. 11, but, are given different identifiers here for clarity. The line 165 is also coupled to one input of an AND gate 166. The output of the AND gate 166 is coupled to a line 167 for providing, to a left-hand keyboard attached thereto, a CLEAR-TO-SEND ($CTS_L$) signal.

The outputs of the line receiver 162 and the gate 161 are coupled to the inputs of a NAND line driver 168. The output of the gate 161 is also coupled to an input of a NAND gate 160. The output of the gate 169 is coupled through an inverting line driver 170 to a control line 171 for providing to a terminal connected thereto a CLEAR-TO-SEND signal ($CTS_T$). The output of the line driver 168 is coupled through the double-pole, double-throw switch 25, described above with respect to FIG. 2, to an inverting line receiver 172 and a NAND gate 173, connected as an inverter, to a second input of the gate 166, a second input of the gate 169 and one input of an AND gate 174. A second input of the gate 174 is enabled by a +5 volt supply. The output of the gate 174 is coupled to a control line 175 for providing to a right-hand keyboard attached thereto a CLEAR-TO-SEND signal ($CTS_R$). The lines 167 and 175 correspond to the line 148 of FIG. 11, but are given different identifiers here for clarity.

In operation, the switch 25, when placed in its modem position, couples the REQUEST-TO-SEND signal to a modem attached to a control line 180 and provides a path for CLEAR-TO-SEND signals received from the modem on a control line 181 to the control lines 167,171 and 175. When switch 25 is in its local position, the REQUEST-TO-SEND signals are passed from the output of the line driver 168 directly to the input of the line receiver 172 and then to the control lines 167,171 and 175. It will be noted, however, that regardless of the position of the switch 25, the circuit 160 will arbitrate simultaneous REQUEST-TO-SEND signals from the right and left keyboards and a terminal attached thereto by giving priority first to the right keyboard, then the left keyboard and finally the terminal. In this fashion, the circuit 160 prevents destructive data collisions.

Figure 13:
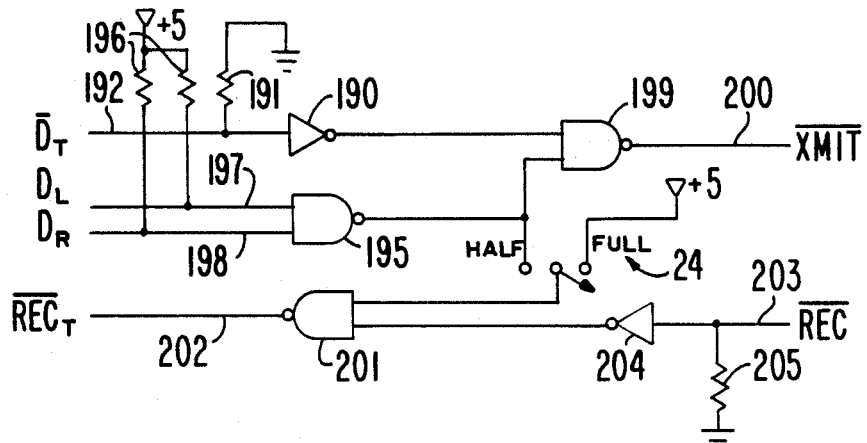
FIG. 13 is a schematic diagram of a data flow path circuit according to the present invention.

Referring to FIG. 13, there is provided an inverting line receiver 190 and a NAND gate 195. The input of the line receiver 190 is coupled to ground through a 4.7K ohm resistor 191 and to a data line 192 for receiving data signals ($D_T$) from a terminal connected thereto. The inputs to the gate 195 are coupled to a +5 volt supply through a pair of 4.7K ohm resistors 196 and to a pair of data lines 197,198 for receiving from a left and right hand keyboard attached thereto data signals ($D_L$ and $D_R$) respectively. The outputs of the line receiver 190 and gate 195 are coupled to a NAND line driver 199 for providing on a data transmission line 200 data signals from a terminal, a left and a right keyboard attached to the line 192,197 and 198, respectively. The output of the gate 195 is also coupled, through the switch 24 described above with respect to FIG. 2, to one input of a NAND line driver 201. The output of the line driver 201 is coupled to a data transmission line 202 for providing to a terminal connected thereto, data signals ($REC_T$). The other input to the gate 201 is coupled to a data transmission line 203 through an inverting line receiver 204 for receiving from a modem connected thereto, data signals (REC). Line 203 is also coupled to ground through a 4.7K ohm resistor 205.

In operation, when switch 24 is in its half duplex position, data from a keyboard is transmitted to a modem connected to line 200 and to a terminal connected to line 202. If the modem returns the data signal, i.e. an echo, on the line 203, duplicate characters will be transmitted to the terminal. To prevent this from happening, switch 24 can be moved to its full duplex position wherein the line driver 201 is continuously enabled by a +5 volt supply. With switch 34 in its full duplex position, only the echo will be transmitted to the terminal.

If no modem is connected to either line 200 or 203, switch 24 is placed in its half duplex position so that keyboard generated characters will be transmitted to a terminal attached to line 202.

The chord data entry system is comprised of the hardware described above together with corresponding coding for microprocessor 131. The nature of such coding is considered obvious in view of the operating specifications set forth herein. An example of coding which can be used is appended hereto and marked CHORD PROGRAM.

The CHORD data entry system will operate with a wide variety of computing equipment. An important feature of the operation of the CHORD keyboard 3 is that characters are generated in a unique way by combinations of keys (chords), as well as, by distinct keys. Since all of the standard characters can be formed by combinations of five keys, together with appropriate mode switch keys, 10 keys are sufficient to provide a rich variety of modes and chords for generating over 256 unique characters. With suitable placement of the 10 keys, an operator never has to move his or her hand from the basic data entry position. This feature improves speed, accuracy and convenience.

The correspondence between the chords and the characters they represent has been carefully chosen. Frequently used letters are produced by chords that are simple to form. Likewise, common letter sequences are produced by chords that are easily formed in sequence. As an additional convenience, the CHORD keyboard operates in either right or left hand mode. Thus, the ergonomic features apply for data entry with either hand or for the simultaneous use of two keyboards, one with each hand.

The CHORD supports the entire ASCII character set, transmitting standard RS232-C serial output at the popular baud rates up to 9600 baud with any parity option and in either a half or full duplex mode. It can also be programmed by a user to transmit data at a variety of special (custom) rates. There are a number of other facilities for customizing the operational characteristics including: specification of various delay characteristics (e.g. for repeated characters), and specification of alternate special characters generated by certain "control key" chords such as "escape", "delete", "back space", etc.

In addition, there is a special graphics mode that allows the keyboard to act as a "graphics mouse". In this mode, when an operator applies a light horizontal pressure to the body of the keyboard, the cursor on a computer screen moves in the corresponding direction. The speed of the cursor movement is controlled by the intensity of the applied pressure. This option is valuable for entering and manipulating graphic information interactively and is a convenient means for positioning the cursor in text editing. The CHORD is extremely powerful in this mode because of its full ASCII data entry capabilities in combination with the cursor control.

Referring to FIG. 2, and the two RS232-C outlets 20,21 marked "TERMINAL" and "MODEM," the TERMINAL outlet 20 should be connected to a local terminal or computing equipment using a standard RS232-C connecting cable. If a modem is included in the system, it should be similarly connected to the MODEM outlet 21. The CHORD keyboards 3,6 are plugged into the Data Exchange module keyboard plugs 22,23. If only one keyboard is used, it should use the plug 23 marked "KBR."

In operation, data from the modem passes directly through the Data Exchange module to the terminal or local computing equipment. Similarly, data from the CHORD keyboards 3,6 or the terminal will pass through the Data Exchange module to the modem. If an attempt is made to send data to the modem from both the terminal and CHORD keyboards 3,6 at the same time, the right-hand keyboard 3 will take precedence.

Referring to the two toggle switches 24,25 underneath the Data Exchange module 2, the one labeled DUPLEX, switch 24, provides for HALF and FULL duplex operation. In HALF duplex mode, data from the CHORD keyboards 3,6 are routed to both the TERMINAL and the MODEM outlets. In FULL duplex mode, the data are routed only to the MODEM outlet. If no modem is connected, the switch should be in the HALF DUPLEX position. Switch 25 should be in the modem position only if a modem is attached to the data exchange module.

Referring to the keyboard initialization switches 60, the CHORD goes through an initialization sequence when first turned or when a "hard reset" is invoked. One step of the initialization sequence involves reading the settings on eight "DIP" initialization switches located under each of the keyboard cases. (Each keyboard functions independently.) These establish a set of default operating characteristics and are normally set when the unit is installed in a particular computing environment. The functions of the switches 60 are given in Table 2.

TABLE 2

| Switch On | Keyboard Initialization Switches Each Keyboard Case | |
|---|---|
| | Effect |
| 1 | Set "zero" parity mode |
| 2 | Set "odd" parity mode |
| 3 | Set left-hand mode |
| 4 | Reduce key read period |
| 5 | Reduce key release delay period |
| 6 | Add 1 to the baud rate select index |
| 7 | Add 2 to the baud rate select index |
| 8 | Add 4 to the baud rate select index |

The interpretation of the first two "parity" switches is given in Table 3.

TABLE 3

| Interpretation of the Parity Switches | | |
|---|---|---|
| Parity | Switch 1 | Switch 2 |
| Even | Off | Off |
| Odd | Off | On |
| Zero | On | Off |
| Mark | On | On |

When the left hand mode is selected, the keys are interpreted in a mirror image manner relative to the right hand mode.

When first using the CHORD, an operator will wish to have plenty of time to form the desired characters on the keys. For this, the operator should set switches 4 and 5 off. As an operator gains experience, however, he or she will probably want switch 4 or 5 or both on for increased speed.

The baud rate select index is initially zero so that switches 6 through 8 can cause it to assume any value from 0 through 7. The interpretations of these index values are given in Table 4.

TABLE 4

| Baud Rate Selection Indexes | | | | |
|---|---|---|---|---|
| SWITCH | | | Baud rate | Data Transmission |
| 5 | 6 | 7 | Select index | rate (baud) |
| OFF | OFF | OFF | 0 | 300 |
| ON | OFF | OFF | 1 | 600 |
| OFF | ON | OFF | 2 | 1200 |
| ON | ON | OFF | 3 | 1800 |
| OFF | OFF | ON | 4 | 2400 |
| ON | OFF | ON | 5 | 3600 |
| OFF | ON | ON | 6 | 4800 |
| ON | ON | ON | 7 | 9600 |

Referring to the keyboard 3, the keyboard consists of ten keys arranged for comfortable access by either hand as illustrated in FIGS. 14 and 15. The five lettered keys shown in FIGS. 14, 15 are the control keys and the numbered ones are the data keys. Numbers, letters and other keyed data are normally entered via the data keys. Because the keyboard is designed to be used in either a right or left hand mode, the function of each key depends upon which mode is in effect. FIGS. 14 and 15 illustrate the key interpretation for each of these modes. For either hand, the home position is with the thumb over data key 1, the pointer finger over key 2, the middle finger over key 3, etc. Similarly, control key N is always pressed by the thumb, S by the pointer finger, B by the middle finger, etc.

The significance of the letters in FIGS. 14, 15 is as follows:

N—Numeric shift key (alphabetic to numeric and back)

S—Alphabetic shift key (lower case to upper case and back)

B—Blank space key

R—Carriage return key

C—CONTROL mode key (needed for terminal operation)

The numbers and letters in FIGS. 14, 15 are used to indicate the key combinations (chords) used to enter data via the keyboard. Herein below, dots (periods) are included to graphically illustrate which fingers (including the thumb) are to be used for right hand operation. Thus, pattern N.... means the control key N is the only key pressed, using the thumb. Similarly, pattern .23.5 means simultaneously that data keys 2, 3 and 5 are pressed with the pointer, middle and fifth fingers. The keys do not have to be pressed at exactly the same time because the CHORD "watches" the keys for a short time before interpreting the pattern entered. For example, after the first key is depressed, the CHORD "looks" at the keyboard until either a predetermined period, e.g. 20 ms, elapses or another key is depressed. If one is depressed, it again "looks" at the keyboard until the predetermined time period elapses or another key is depressed. This "watching" will continue until no key is depressed within the 20 ms watching period or five keys have been depressed. When this occurs, the CHORD enters a "processing" state, interprets the pattern of keys depressed and outputs the appropriate data or control signal and then continuously monitors the keys to determine if any key is in a depressed state. If a key is found to be in a depressed state, the CHORD initiates the "watching" state for a period of time as described above. As described above, switch 4 is used for changing the "watching" period. If the keys of a chord are held depressed longer than a predetermined time period, the keyboard repeats the corresponding interpretation and response.

The mode lights 40–47 in FIG. 1 on each keyboard indicate its current state. The names and purposes of these are given in Table 5. The table also describes the control key patterns that affect these lights. For example, if light G is on, the keyboard is in its graphics state, e.g. monitoring the cursor control switches of FIG. 6. Entering the pattern N.B.. once will cause light G to go out, and put the keyboard in a non-graphics state. Entering N.B.. again will cause light G to turn back on. This is called a toggle action and is characteristic of many of the operational states of the CHORD. Control key patterns (key combinations) that affect the operational state of the keyboard are called control-state patterns.

TABLE 5

| Common Operational States for the Keyboard | | | |
|---|---|---|---|
| Light | Control | State | State |
| L | NS... | On | Left hand keyboard operation |
| | | Off | Right hand keyboard operation |
| M | NS.R. | On | Modify operational parameter |
| | | Off | Normal keyboard operation |
| C | ....C | On | Special control characters |
| | | Off | Normal alphabetic or numeric characters |
| S | .S... | On | Upper case letters or modified numerics |
| | | Off | Lower case letters or standard numerics |
| N | N.... | On | Numeric interpretation of data keys |
| | | Off | Alphabetic interpretation of data keys |

TABLE 5-continued

| Common Operational States for the Keyboard | | | |
|---|---|---|---|
| Light | Control | State | State |
| G | N.B.. | On | Graphics cursor control |
| | | Off | Normal keyboard operation |
| E | — | On | (Blinking) Unrecognized chord-entered |
| | | Off | Normal (Turned off by NS.RC) |
| O | | On | Power is on and the system is operational |

The parity of transmitted data may be modified by the odd/even or zero/one parity control-state patterns. Each time one of the chords is entered, the corresponding internal flag is switched (odd to even, even to odd, one to zero, etc.) There is no convenient light pattern that indicates the current parity option.

The shift states (upper case, numeric and control) are toggled slightly differently. If an operator enters a shift such as .S..., light S will turn on, but it will go out when any data character is entered. To make lights S (or N or C) stay on, one enters the shift chord, e.g. .S..., twice. Then to turn it off, one enters the shift chord a third time. This is called a three-state toggle action. The double entry of a shift chord is like a shift lock on a typical keyboard or typewriter.

Hard and soft reset patterns NSBRC and NS.RC are two control-state patterns that do not involve toggle action. Occasionally the error light E will blink as a result of an invalid keyboard entry. This situation can normally be resolved by entering the soft reset chord. It clears the error flag and certain temporary registers used for other special operations described below. Since the effects of a soft reset are quite minor, it can be entered without much concern.

The hard reset completely reloads all of the internal registers in the module 131 and interprets the initialization switches 60 to set both internal flags and the baud rate. It thus destroys any special options which have been programmed into the keyboard, i.e. module 131. Of course, if special programmed options are not used, then the hard reset will produce the same apparent effects as the soft reset.

For speed and convenience, some control key patterns are used for very common character data, such as the blank space and carriage return. These are called control-transmit patterns. The functions of control-transmit patterns are independent of the shift state of the keyboard. The standard (default) characters transmitted by control-transmit patterns are given in Table 6.

TABLE 6

| Standard Functions of the Control Key Data Chords | | |
|---|---|---|
| Chord | Character | Description |
| ..B.. | blank | Blank space character |
| ...R. | carriage return | Carriage return character |
| ..BR. | escape | Terminal escape character |
| .SB.. | delete | Character delete |
| .S.R. | back space | |
| .SBR. | line feed | |
| NSB.. | horizontal tab | Tab forward |
| N...C | comma | |
| N.BR. | period | |
| .S..C | break | 250 millisecond break |

The entry of numeric data via the CHORD keyboard 3 is relatively simple and natural. In fact, the patterns for entering numbers 1 through 5 have already been revealed in FIGS. 14, 15. The keyboard operates in three different numeric states as indicated below.

| STATE | MODE LIGHT | | | NOTES |
|---|---|---|---|---|
| | C | S | N | |
| NUMERIC | OFF | OFF | ON | STANDARD |
| | OFF | ON | ON | MODIFIED |
| | ON | OFF | ON | HEXADECIMAL |
| ALPHABETIC | OFF | OFF | OFF | LOWER CASE |
| | OFF | ON | OFF | UPPER CASE |
| CONTROL | ON | EITHER | OFF | STANDARD |
| | ON | ON | ON | MODIFIED |

In any of the three numeric states, the chords for the numeric digits are:

```
1 1....    2.2...   3..3..   4...4.   5....5
6 12...    7 1.3..  8 1..4.  9 1...5  0.234.
```

The chords for period, comma and hyphen (or minus) are:

```
.  ...345
,  12.45
—  12345
```

This applies not only to the three numeric states but also to the upper and lower case alphabetic states discussed below. There are several other frequently used symbols that are common among the three numeric states. These symbols are produced by the following chords:

```
+  1.3.5
*  .2345
/  123..
=  1234.
$  1.34.
_  .23.5    underscore
(  12..5
)  1..45
```

Note that reflective symbols (and) have reflective chords 12..5 and 1..45. Note also that the symbol), which naturally appears to the right, has more keys to the right (in right hand mode) depressed in its chord 1..45. This memory aid is used for all of the reflective symbols which are as follows:

```
( 12..5       ) 1..45
< 123.5       > 1.345
[ 12.4.       ] .2.45
```

The symbols {and} are obtained using the same chords as for [and] in the modified state (lights S and N on).

Besides the numbers and symbols described above, the following special characters may be entered only in the standard numeric state:

```
?  .23..
!  .2.4.
%  .2..5
'  ..34.    apostrophe
"  ..3.5
@  ...45
```

These same chords are interpreted differently in the modified and hexadecimal states, which will be discussed below. The interpretations in the modified state are as follows:

|   |   |   |
|---|---|---|
|   | . 23 . . |   |
| # | . 2 . 4 . |   |
| & | . 2 . . 5 |   |
| ' | . . 34 . | back apostrophe |
|   | . . 3 . 5 |   |
| @ | . . . 45 |   |

In order to enter hexadecimal data, the keyboard must be put in its numeric-hexadecimal mode as indicated below.

|  | MODE LIGHT | | | |
|---|---|---|---|---|
| MODE | C | S | N | NOTES |
| NUMERIC | ON | OFF | ON | HEXADECIMAL |

In the numeric-hexadecimal mode, the chords for the hexadecimal digits are as follows:

| | | | | |
|---|---|---|---|---|
| 1 1 . . . . | 2 . 2 . . . | 3 . . 3 . . | 4 . . . 4 . | 5 . . . . 5 |
| 6 12 . . . | 7 1 . 3 . . | 8 1 . . 4 . | 9 1 . . . 5 | A . 23 . . |
| B . 2 . 4 . | C . 2 . . 5 | D . . 34 . | E . . 3 . 5 | F . . . 45 |
| 0 . 234 . | | | | |

It is fortuitous that there happens to be exactly 15 combinations of 5 things taken 1 or 2 at the time. It makes the above assignment of chords remarkably natural and easy to remember. It also explains why the chord for 0 is a three key chord.

The remaining 15 symbols that can be entered in the numeric-hexadecimal mode can also be entered in the numeric standard mode as described above. The chords for these symbols are as follows:

| | | | | |
|---|---|---|---|---|
| ( 12 . . 5 | ) 1 . . 45 | [ 12 . 4 . | ] . 2 . 45 | _ . 23 . 5 |
| < 123 . 5 | > 1 . 345 | $ 1 . 34 . | . . . 345 | , 12 . 45 |
| + 1 . 3 . 5 | − 12345 | * . 2345 | / 123 . . | = 1234 . |

The data key patterns for alphabetic information have been carefully chosen to maximize the ultimate speed and ease of data entry. There is no obvious relationship which allows one to deduce the patterns corresponding to the letters, but they are easily learned.

|  | MODE LIGHT | | | |
|---|---|---|---|---|
| MODE | C | S | N | NOTES |
| ALPHABETIC | OFF | OFF | OFF | LOWER CASE |
|  | OFF | ON | OFF | UPPER CASE |

In the alphabetic state, several important punctuation marks can be produced directly from the data keys as follows:

|   |   |   |
|---|---|---|
|   | . . . 345 |   |
| , | 12 . 45 | comma |
| ; | . 23 . 5 |   |
| : | 123 . 5 |   |
| - | 12345 | hyphen |

Other common symbols are produced by changing to numeric-standard mode (lights N on, C and S off) or numeric-modified mode (lights N and S on, C off) and by entering data chords as described. The data chords for the letters are presented below:

| | |
|---|---|
| a | 1 . . . . |
| b | . 2 . 45 |
| c | 1 . . 4 . |
| d | . 2 . 4 . |
| e | . 2 . . . |
| f | . 2345 |
| g | . . . 45 |
| h | . 23 . . |
| i | . . 34 . |
| j | 12 . . 5 |
| k | 1 . 34 . |
| l | 1 . 3 . . |
| m | 1 . . . 5 |
| n | . . . 4 . |
| o | . . . . 5 |
| p | 123 . . |
| q | 1 . 3 . 5 |
| r | 12 . . . |
| s | . 234 . |
| t | . . 3 . . |
| u | . . 3 . 5 |
| v | 1234 . |
| w | 1 . . 45 |
| x | 1 . 345 |
| y | . 2 . . 5 |
| z | 12 . 4 . |

When the keyboard is in its graphics state (light G on) data can be transmitted in a different way. Cursor movement is achieved by sending ANSI standard "escape" character sequences to the computer or terminal. If an operator applies pressure to the keyboard in a direction away from himself (in the direction of the connection wire to the data exchange module), the ASCII characters ESC [ A are sent. This is interpreted by the computer as "move the cursor up one line." Similarly, if one applies pressure to the keyboard to the right, the characters ESC [ C are sent. If one applies pressure in a direction half way between those two directions, all six characters ESC [ A ESC [ C are sent. The sending of these sequences is repeated as long as the keyboard pressure is applied. Similar actions take place in response to pressure in other directions. The escape sequences used for the basic four directions are as follows:

|   |   |
|---|---|
| UP | ESC [ A |
| DOWN | ESC [ B |
| RIGHT | ESC [ C |
| LEFT | ESC [ D |

The rate at which these sequences are transmitted depends upon the magnitude of the applied pressure.

Referring to FIG. 6, if the pressure applied to the keyboard only breaks the contact between one of the poles 85-88 and the corresponding first contact 100-103, the cursor will move slowly. However, if sufficient force is applied for one of the poles to make contact with the corresponding second contact 89-92, the cursor will move more rapidly.

For text processing, the cursor is normally used for pointing to specific words and the keyboard is used to enter editing commands. A similar mode of operation is used for graphics work with the edit commands replaced by graphics commands. In either case, the burden is upon the computer to properly interpret the commands and cursor movement signals.

The internal parameters that control the behavior of the CHORD keyboard have been carefully selected to give convenient, smooth and efficient operation. Circumstances that require changes to some of these parameter values are rare, but it is possible to make such changes if required.

Each CHORD keyboard is controlled by the microcomputer module 131 that has a small random access memory (RAM) used for various purposes. Several locations in this RAM hold operational control parameters that are loaded whenever power is turned on or a "hard reset" is invoked. The purposes and locations of these control parameters are given in Table 7.

TABLE 7

KEYBOARD CONTROL PARAMETERS

| NAME | LOCATION | FUNCTION | VALUE |
|---|---|---|---|
| PERIOD | 21 | ASCII character sent for N . BR . | 2E |
| BLANK | 22 | ASCII character sent for . . B . . | A0 |
| CAR. RETURN | 23 | ASCII character sent for . . . R . | 8D |
| ESCAPE | 24 | ASCII character sent for . . BR . | 1B |
| BACK SPACE | 25 | ASCII character sent for . S . R . | 88 |
| COMMA | 26 | ASCII character sent for N . . . C | AC |
| LINE FEED | 27 | ASCII character sent for . SBR . | 0A |
| TAB | 28 | ASCII character sent for NSB . . | 09 |
| DELETE | 29 | ASCII character sent for . SB . . | FF |
| BRI | 36 | Baud rate index 00 to | FF |
| BREAK | 18 | Time delay for BREAK - 250 ms | 0907 |

As can be seen, the ASCII characters for the control key data chords (see Table 7) are stored with even parity. This convention should be followed by any substitutions which are made.

In order to modify a parameter, the keyboard is first put in its numeric-hexadecimal state. Next the modify mode light is turned on by entering the NS.R. control key pattern. Finally, two hexadecimal location digits followed by the two data digits are entered. After the last data digit is entered, the modify light will go out.

It is possible, albeit awkward, to inspect the contents of a RAM location. This task must also be done in the numeric-hexadecimal state. To inspect location 23, for example, the following is entered:

.S.RC .234. .234. .2.. ..3. ...R.

The contents of location 23 will appear in the mode lights as a binary number. The contents of location 24 may then be inspected by simply entering ...R. One can continue in this manner up to location 3F, the last location in RAM. Beyond that, the light patterns will not be meaningful. In order to terminate the inspection mode, a soft reset chord NS.RC may be entered.

Note that the location to be inspected was specified by 0023 above. After either a "modify" chord NS.R. or an "inspect" chord .S.RC, the keyboard expects four hexadecimal digits. For inspection, the first two of those digits must be 00 in order to get meaningful information.

As indicated in Table 4, a baud rate index in the range 0 to 7 is established by the initialization switches when you turn the power on or enter a hard reset. One may change that index by loading a different number in location 36. For example, to set the baud rate to 1800 bits per second, one would set BRI to 3 (see Table 4). If a BRI (baud rate index) is entered that is not in the range 0 to 7, it is used directly by the keyboard to establish a new baud rate. The direct BRI may be in the range 08 to FF (hexadecimal) and generates a baud rate according to the following formula:

$$\text{RATE} = [76800/(\text{BRID}+6)] \text{ bits per second}$$

where BRID is the decimal equivalent of BRI and the square brackets indicate that the result is rounded to the nearest integer. For example, if BRI=1A, then BRID=26 and RATE=2400 bits per second.

While a preferred embodiment of the invention is described above, it is contemplated that various modifications may be made thereto without departing from the spirit and scope of the invention. For example, while the invention has been described with respect to the use of a single keyboard, it is to be understood that two keyboards can be used simultaneously and obviously, in that event, one of the keyboards will be typically operated in a right-hand mode and the other keyboard will be operated in a left-hand mode. The shape of the slip members 71 and 111 may also be changed to have various shapes, such as a U, X, H, or other shape. The switches used for detecting pressure applied to the keyboard and providing cursor control may be replaced by other components, e.g. pressure transducers, finger controlled switches and the like. With respect to the various data and control characters presented, it is also contemplated that in certain applications it may be desirable to change their format. Furthermore, it is recognized that those skilled in the art of programming may device new and possibly more efficient programs which can be employed in the operation of the invention, particularly as new and more advanced microprocessors are developed and used in place of the microprocessor described herein. Accordingly, the above description of a preferred embodiment of the invention is intended only to illustrate the invention and is not intended to be limiting. Thus, it is intended that the scope of the invention should be determined by reference to the claims hereinafter provided.

APPENDIX

CHORD PROGRAM

The following Fortran program presents information for programming the microprocessor module 131.

```
PROGRAM CHORD
IMPLICIT INTEGER*2 (A-Z)
```

```
      COMMON /LINES/  CTS,BUS(11),POE,CL,IL,KL,OL,RTS,STATE,DATA(8)
      COMMON /TABLES/ R(64),ITBL(9),STBL(9),PTBL(22),CSTBL(4),
    1          BTBL(8)
      COMMON /PARAMS/ LI,LS,PBUS
      EQUIVALENCE (ZPAR,R(#33)), (LEFT,R(#34)), (OPAR,R(#35)),
    1    (BAUD,R(#36)), (RDCNT,R(#1A)),(PDCNT,R(#1B)),(GRAPH,R(#32)),
    2    (CTL,R(#2F)), (SHFT,R(#30)), (NUM,R(#31)), (MODIFY,R(#2C)),
    3    (DISPLA,R(#2D)), (ERR,R(#38)), (CNT,R(#3A)), (ADR,R(#3B)),
    4    (VAL,R(#3C))
      EQUIVALENCE (CSL,BUS(11))
100 CALL INIT
    LOOP = 1
120 CALL OUTLIN(#9E)
    CALL LIGHTS
    IF (GRAPH.GT.0 .AND. CSL.EQ.0) CALL OUTLIN(#8E)
    CALL INBUS
    CALL CURSOR(VALUE)
    IF (VALUE.GT.0)              GO TO 300
    CALL CTLKEY(VALUE)
    IF (VALUE.GT.0)              GO TO 300
    IF (VALUE.LT.0)              GO TO 100
    CALL TRANS(VALUE)
    IF (MODIFY.GT.0) THEN
        CALL MODPAR(VALUE)
    ELSE IF (DISPLA.GT.0) THEN
        CALL DISPAR(VALUE)
    ELSE
        CALL SEND(VALUE)
    END IF
300 IF (LOOP.GT.0)               GO TO 120
    STOP
    END
    SUBROUTINE CURSOR(VALUE)
    IMPLICIT INTEGER*2 (A-Z)
    COMMON /LINES/  CTS,BUS(11),POE,CL,IL,KL,OL,RTS,STATE,DATA(8)
    COMMON /TABLES/ R(64),ITBL(9),STBL(9),PTBL(22),CSTBL(4),
  1           BTBL(8)
    COMMON /PARAMS/ LI,LS,PBUS
    EQUIVALENCE (ZPAR,R(#33)), (LEFT,R(#34)), (OPAR,R(#35)),
```

```fortran
1     (BAUD,R(#36)), (RDCNT,R(#1A)),(PDCNT,R(#1B)),(GRAPH,R(#32)),
2     (CTL,R(#2F)), (SHFT,R(#30)), (NUM,R(#31)), (MODIFY,R(#2C)),
3     (DISPLA,R(#2D)), (ERR,R(#38)), (CNT,R(#3A)), (ADR,R(#3B)),
4     (VAL,R(#3C))
  EQUIVALENCE (CSL,BUS(11))
  INTEGER*2 LB(4)
  DATA LB/1,2,10,5/
  IF (GRAPH.EQ.0 .OR. CSL.GT.0) THEN
      VALUE = 0
      RETURN
  END IF
  VALUE = 1
  DO 110 I=1,4
      IF (BUS(LB(I)).GT.0) THEN
          CALL SEND(#1B)
          CALL SEND(#DB)
          CALL SEND(CSTBL(I))
      END IF
110 CONTINUE
  RETURN
  END
  SUBROUTINE CTLKEY(VALUE)
  IMPLICIT INTEGER*2 (A-Z)
  COMMON /LINES/  CTS,BUS(11),POE,CL,IL,KL,OL,RTS,STATE,DATA(8)
  COMMON /TABLES/ R(64),ITBL(9),STBL(9),PTBL(22),CSTBL(4),
1           BTBL(8)
  COMMON /PARAMS/ LI,LS,PBUS
  EQUIVALENCE (ZPAR,R(#33)), (LEFT,R(#34)), (OPAR,R(#35)),
1     (BAUD,R(#36)), (RDCNT,R(#1A)),(PDCNT,R(#1B)),(GRAPH,R(#32)),
2     (CTL,R(#2F)), (SHFT,R(#30)), (NUM,R(#31)), (MODIFY,R(#2C)),
3     (DISPLA,R(#2D)), (ERR,R(#38)), (CNT,R(#3A)), (ADR,R(#3B)),
4     (VAL,R(#3C))
  EQUIVALENCE (CSL,BUS(11))
  VALUE = IAND(PBUS,#CE)
  IF (VALUE.EQ.0) RETURN
  DO 110 I=1,22
      IF (PBUS.EQ.PTBL(I))                    GO TO 130
110 CONTINUE
  ERR = 1
  RETURN
```

```
130 I = #20+I
   IF (I.LE.#29) THEN
      IF (DISPLA.EQ.0) THEN
         CALL SEND(R(I))
      ELSE
         VALUE = 0
      END IF
   ELSE IF (I.EQ.#2A) THEN
      CALL OUTLIN(#1E)
      DATA(1) = 0
   ELSE IF (I.EQ.#2B) THEN
      CALL COPY(4, 0,0, R(#2A),1)
      CALL COPY(6, 0,0, R(#38),1)
   ELSE IF (I.EQ.#36) THEN
      VALUE = -VALUE
   ELSE IF (#2F.LE.I .AND. I.LE.#31) THEN
      R(I) = 1+R(I)
      IF (R(I).GE.3) R(I) = 0
   ELSE
      R(I) = 1-R(I)
   END IF
   RETURN
   END
   SUBROUTINE DISPAR(VALUE)
   IMPLICIT INTEGER*2 (A-Z)
   COMMON /LINES/  CTS,BUS(11),POE,CL,IL,KL,OL,RTS,STATE,DATA(8)
   COMMON /TABLES/ R(64),ITBL(9),STBL(9),PTBL(22),CSTBL(4),
  1             BTBL(8)
   COMMON /PARAMS/ LI,LS,PBUS
   EQUIVALENCE (ZPAR,R(#33)), (LEFT,R(#34)), (OPAR,R(#35)),
  1   (BAUD,R(#36)), (RDCNT,R(#1A)), (PDCNT,R(#1B)),(GRAPH,R(#32)),
  2   (CTL,R(#2F)), (SHFT,R(#30)), (NUM,R(#31)), (MODIFY,R(#2C)),
  3   (DISPLA,R(#2D)), (ERR,R(#38)), (CNT,R(#3A)), (ADR,R(#3B)),
  4   (VAL,R(#3C))
   EQUIVALENCE (CSL,BUS(11))
   IF (VALUE.EQ.#8D) THEN
      CALL OUTDAT(R(ADR))
      ADR = ADR+1
   ELSE
```

```
        ADR = #10*ADR + VAL
        CALL OUTDAT(ADR)
    END IF
    RETURN
    END
    SUBROUTINE MODPAR(VALUE)
    IMPLICIT INTEGER*2 (A-Z)
    COMMON /LINES/  CTS,BUS(11),POE,CL,IL,KL,OL,RTS,STATE,DATA(8)
    COMMON /TABLES/ R(64),ITBL(9),STBL(9),PTBL(22),CSTBL(4),
1           BTBL(8)
    COMMON /PARAMS/ LI,LS,PBUS
    EQUIVALENCE (ZPAR,R(#33)), (LEFT,R(#34)), (OPAR,R(#35)),
1       (BAUD,R(#36)), (RDCNT,R(#1A)),(PDCNT,R(#1B)),(GRAPH,R(#32)),
2       (CTL,R(#2F)), (SHFT,R(#30)), (NUM,R(#31)), (MODIFY,R(#2C)),
3       (DISPLA,R(#2D)), (ERR,R(#38)), (CNT,R(#3A)), (ADR,R(#3B)),
4       (VAL,R(#3C))
    EQUIVALENCE (CSL,BUS(11))
    IF (CNT.EQ.0) ADR = 0
    CNT = 1+CNT
    IF (CNT.LT.3) THEN
        ADR = #10*ADR + VALUE
    ELSE IF (CNT.EQ.3) THEN
        VAL = VALUE
    ELSE
        R(ADR) = #10*VAL+VALUE
        CNT = 0
        MODIFY = 0
    END IF
    RETURN
    END
    SUBROUTINE INIT
    IMPLICIT INTEGER*2 (A-Z)
    COMMON /LINES/  CTS,BUS(11),POE,CL,IL,KL,OL,RTS,STATE,DATA(8)
    COMMON /TABLES/ R(64),ITBL(9),STBL(9),PTBL(22),CSTBL(4),
1           BTBL(8)
    COMMON /PARAMS/ LI,LS,PBUS
    EQUIVALENCE (ZPAR,R(#33)), (LEFT,R(#34)), (OPAR,R(#35)),
1       (BAUD,R(#36)), (RDCNT,R(#1A)),(PDCNT,R(#1B)),(GRAPH,R(#32)),
2       (CTL,R(#2F)), (SHFT,R(#30)), (NUM,R(#31)), (MODIFY,R(#2C)),
3       (DISPLA,R(#2D)), (ERR,R(#38)), (CNT,R(#3A)), (ADR,R(#3B)),
4       (VAL,R(#3C))
```

```
      EQUIVALENCE (CSL,BUS(11))
      INTEGER*2  IINL(9),SINL(9),PINL(22),CSINL(4),BINL(8)
      CHARACTER*1 CHR
      DATA IINL/
1     #9,#7,#88,#34,#71,#8,#12,#E,#60/
      DATA SINL/
1     #2E,#A0,#8D,#1B,#88,#AC,#0A,#09,#FF/
      DATA PINL/
1     #E,#2,#4,#6,#44,#88,#46,#4A,#44,#C0,
2     #CC,#4C,#C4,#8C,#80,#40,#8,#A,#84,#48,#C,#CE/
      DATA CSINL/
1     #41,#42,#C3,#44/
      DATA BINL/
1     #FA,#7A,#3A,#25,#1A,#F,#A,#2/
      LI = #18
      LS = #21
      POE= #40
      CL = #80
      IL = #2
      KL = #10
      OL = #20
      RTS= #1
      CALL COPY(9,IINL,1,ITBL,1)
      CALL COPY(9,SINL,1,STBL,1)
      CALL COPY(22,PINL,1,PTBL,1)
      CALL COPY(8,BINL,1,BTBL,1)
      CALL COPY(4,CSINL,1,CSTBL,1)
      CALL OUTLIN(#80)
      CALL COPY(64, 0,0, R,1)
      CALL COPY(9, ITBL,1, R(LI),1)
      CALL COPY(9, STBL,1, R(LS),1)
      CALL INBUS
      ZPAR = BUS(1)
      OPAR = BUS(3)
      LEFT = BUS(2)
      BAUD = BUS(6)+2*BUS(7)+4*BUS(8)
      IF (BUS(4).NE.0) RDCNT = #70
      IF (BUS(5).NE.0) PDCNT = #28
      RETURN
1 FORMAT(' System table ',A)
      END
```

```
      SUBROUTINE INBUS
      IMPLICIT INTEGER*2 (A-Z)
      COMMON /LINES/  CTS,BUS(11),POE,CL,IL,KL,OL,RTS,STATE,DATA(8)
      COMMON /TABLES/ R(64),ITBL(9),STBL(9),PTBL(22),CSTBL(4),
     1          BTBL(8)
      COMMON /PARAMS/ LI,LS,PBUS
      EQUIVALENCE (ZPAR,R(#33)), (LEFT,R(#34)), (OPAR,R(#35)),
     1    (BAUD,R(#36)), (RDCNT,R(#1A)),(PDCNT,R(#1B)),(GRAPH,R(#32)),
     2    (CTL,R(#2F)), (SHFT,R(#30)), (NUM,R(#31)), (MODIFY,R(#2C)),
     3    (DISPLA,R(#2D)), (ERR,R(#38)), (CNT,R(#3A)), (ADR,R(#3B)),
     4    (VAL,R(#3C))
      EQUIVALENCE (CSL,BUS(11))
      INTEGER*2 OLD(10),LB(11)
      CHARACTER*3 HX3
      CHARACTER*8 CHORD
      CHARACTER*1 CHD(8),CHR(11)
      EQUIVALENCE (CHD,CHORD)
      DATA CHR/'5','4','C','S','1','2','N','R','B','3','G'/
      DATA LB /7,4,9,8,3, 5,6,10,2,1, 11/
      CALL COPY(10, 0,0, OLD,1)
      CALL COPY(11, 0,0, BUS,1)
100   DO 130 I=1,5
        DO 120 J=1,RDCNT
      IF (I+J.GT.2)                    GO TO 200
      IF (STATE.EQ.#80) THEN
          WRITE(*,'(A)') ' Switch [74 82 56 31   ] '
      END IF
      WRITE(*,'(A\)') ' Chord? [NSBRC 12345 G] '
          READ(*,'(A8)') CHORD
          DO 115 K=1,8
            DO 110 L=1,11
              IF (CHD(K).EQ.CHR(L)) BUS(L)=1
110         CONTINUE
115       CONTINUE
120   CONTINUE
      L = 0
      DO 125 K=1,10
        IF (BUS(K).NE.OLD(K)) THEN
          OLD(K) = BUS(K)
          L = 1
```

```
          END IF
125    CONTINUE
       IF (L.EQ.0)                    GO TO 200
130 CONTINUE
200 IF (STATE.EQ.#80) THEN
       BUS(1) = 1-BUS(1)
       BUS(3) = 1-BUS(3)
    END IF
    IF (LEFT.GT.0) THEN
    DO 205 I=1,4
       K = BUS(I)
       BUS(I) = BUS(I+4)
205    BUS(I+4) = K
    END IF
    PBUS = 0
    DO 210 I=1,10
210    PBUS = 2*PBUS+BUS(I)
    IF (PBUS.EQ.0)                    GO TO 100
    WRITE(*,1) (BUS(LB(I)),I=1,11)
    RETURN
  1 FORMAT(' Input pattern - NSBRC 12345 6'/
   1       17X,5I1,I2,4I1,I2)
    END
    SUBROUTINE OUTDAT(VALUE)
    IMPLICIT INTEGER*2 (A-Z)
    COMMON /LINES/  CTS,BUS(11),POE,CL,IL,KL,OL,RTS,STATE,DATA(8)
    COMMON /TABLES/ R(64),ITBL(9),STBL(9),PTBL(22),CSTBL(4),
   1            BTBL(8)
    COMMON /PARAMS/ LI,LS,PBUS
    EQUIVALENCE (ZPAR,R(#33)), (LEFT,R(#34)), (OPAR,R(#35)),
   1   (BAUD,R(#36)), (RDCNT,R(#1A)),(PDCNT,R(#1B)),(GRAPH,R(#32)),
   2   (CTL,R(#2F)), (SHFT,R(#30)), (NUM,R(#31)), (MODIFY,R(#2C)),
   3   (DISPLA,R(#2D)), (ERR,R(#38)), (CNT,R(#3A)), (ADR,R(#3B)),
   4   (VAL,R(#3C))
    EQUIVALENCE (CSL,BUS(11))
    CHARACTER*2 HX
    T = VALUE
    BIT = #80
    DO 110 I=8,1,-1
       IF (T.GE.BIT) THEN
```

```
          T = T-BIT
          DATA(I) = 1
       ELSE
          DATA(I) = 0
       END IF
110    BIT = BIT/2
       IF (IAND(STATE,#20).EQ.0) THEN
          WRITE(*,1) (DATA(I),I=8,1,-1)
       RETURN
  1    FORMAT(' Indicator Lights: L M C S N G E O'/18X,8I2)
       END
       SUBROUTINE LIGHTS(VALUE)
       IMPLICIT INTEGER*2 (A-Z)
       COMMON /LINES/  CTS,BUS(11),POE,CL,IL,KL,OL,RTS,STATE,DATA(8)
       COMMON /TABLES/ R(64),ITBL(9),STBL(9),PTBL(22),CSTBL(4),
  1              BTBL(8)
       COMMON /PARAMS/ LI,LS,PBUS
       EQUIVALENCE (ZPAR,R(#33)), (LEFT,R(#34)), (OPAR,R(#35)),
  1      (BAUD,R(#36)), (RDCNT,R(#1A)),(PDCNT,R(#1B)),(GRAPH,R(#32)),
  2      (CTL,R(#2F)), (SHFT,R(#30)), (NUM,R(#31)), (MODIFY,R(#2C)),
  3      (DISPLA,R(#2D)), (ERR,R(#38)), (CNT,R(#3A)), (ADR,R(#3B)),
  4      (VAL,R(#3C))
       EQUIVALENCE (CSL,BUS(11))
       INTEGER*2 DTBL(31,7)
       VALUE = 0
       IF (LEFT.NE.0) VALUE = VALUE+1
       VALUE = VALUE+VALUE
       IF (MODIFY.NE.0) VALUE = VALUE+1
       VALUE = VALUE+VALUE
       IF (CTL.NE.0) VALUE = VALUE+1
       VALUE = VALUE+VALUE
       IF (SHFT.NE.0) VALUE = VALUE+1
       VALUE = VALUE+VALUE
       IF (NUM.NE.0) VALUE = VALUE+1
       VALUE = VALUE+VALUE
       IF (GRAPH.NE.0) VALUE = VALUE+1
       VALUE = VALUE+VALUE
       IF (ERR.NE.0) VALUE = VALUE+1
       VALUE = VALUE+VALUE+1
       CALL OUTDAT(VALUE)
```

```
      RETURN
      END
      SUBROUTINE SEND(VALUE)
      IMPLICIT INTEGER*2 (A-Z)
      COMMON /LINES/ CTS,BUS(11),POE,CL,IL,KL,OL,RTS,STATE,DATA(8)
      COMMON /TABLES/ R(64),ITBL(9),STBL(9),PTBL(22),CSTBL(4),
     1       BTBL(8)
      COMMON /PARAMS/ LI,LS,PBUS
      EQUIVALENCE (ZPAR,R(#33)), (LEFT,R(#34)), (OPAR,R(#35)),
     1    (BAUD,R(#36)), (RDCNT,R(#1A)),(PDCNT,R(#1B)),(GRAPH,R(#32)),
     2    (CTL,R(#2F)), (SHFT,R(#30)), (NUM,R(#31)), (MODIFY,R(#2C)),
     3    (DISPLA,R(#2D)), (ERR,R(#38)), (CNT,R(#3A)), (ADR,R(#3B)),
     4    (VAL,R(#3C))
      EQUIVALENCE (CSL,BUS(11))
      CHARACTER HX*2,CHR*2,CH(2)*1
      EQUIVALENCE (CHR,CH)
      IF (OPAR.GT.0) THEN
         IF (ZPAR.GT.0) THEN
            IF (VALUE.LT.#80) VALUE = VALUE+#80
         ELSE
            IF (VALUE.LT.#80) THEN
               VALUE = VALUE+#80
            ELSE
               VALUE = VALUE-#80
            END IF
         END IF
      ELSE
         IF (ZPAR.GT.0) THEN
            IF (VALUE.GE.#80) VALUE = VALUE-#80
         END IF
      END IF
      IF (BAUD.LE.7) THEN
         BRI = BTBL(BAUD+1)
      ELSE
         BRI = BAUD
      END IF
      RATE = 76800/(BRI+6)
110   CONTINUE
      CALL OUTLIN(#9F)
120   CONTINUE
```

```
      DATA(1) = 0
   CALL OUTDAT(VALUE)
   CALL OUTLIN(#5F)
   CALL OUTLIN(#3F)
      DO 150 I=2,8
         DATA(1) = DATA(I)
150   CONTINUE
      DATA(1) = 1
   DO 210 I=#2F,#31
      IF (R(I).EQ.1) R(I) = 0
210 CONTINUE
   CALL HEX(VALUE,HX)
   I = IAND(VALUE,#7F)
   IF (I.LT.#20) THEN
      I = I+#40
      CH(1) = '^'
   ELSE
      CH(1) = ' '
   END IF
   CH(2) = CHAR(I)
   WRITE(*,1) CHR,HX,RATE
   RETURN
 1 FORMAT(' <Transmit datum: ',A2,' (hex. value: ',A2,
  1   '), at baud rate',I5,'>')
   END
   SUBROUTINE TRANS(VALUE)
   IMPLICIT INTEGER*2 (A-Z)
   COMMON /LINES/  CTS,BUS(11),POE,CL,IL,KL,OL,RTS,STATE,DATA(8)
   COMMON /TABLES/ R(64),ITBL(9),STBL(9),PTBL(22),CSTBL(4),
  1         BTBL(8)
   COMMON /PARAMS/ LI,LS,PBUS
   EQUIVALENCE (ZPAR,R(#33)), (LEFT,R(#34)), (OPAR,R(#35)),
  1  (BAUD,R(#36)), (RDCNT,R(#1A)),(PDCNT,R(#1B)),(GRAPH,R(#32)),
  2  (CTL,R(#2F)), (SHFT,R(#30)), (NUM,R(#31)), (MODIFY,R(#2C)),
  3  (DISPLA,R(#2D)), (ERR,R(#38)), (CNT,R(#3A)), (ADR,R(#3B)),
  4  (VAL,R(#3C))
   EQUIVALENCE (CSL,BUS(11))
   INTEGER*2 DTBL(31,7)
   DATA DTBL/
```

```
1 #6F,#EE,#E7,#74,#F5,#69,#2E,#E1,#ED,#63,#77,#6C,#71,#EB,#78,#65
2,#F9,#E4,#E2,#E8,#BB,#F3,#66,#72,#6A,#FA,#AC,#F0,#3A,#F6,#2D,#35
3,#B4,#C0,#33,#22,#27,#2E,#B1,#39,#B8,#A9,#B7,#2B,#24,#BE,#B2,#A5
4,#21,#DD,#3F,#5F,#30,#AA,#36,#28,#DB,#AC,#AF,#3C,#BD,#2D,#CF,#4E
5,#47,#D4,#55,#C9,#2E,#41,#4D,#C3,#D7,#CC,#D1,#4B,#D8,#C5,#59,#44
6,#42,#48,#BB,#53,#C6,#D2,#CA,#5A,#AC,#50,#3A,#56,#2D,#35,#B4,#C0
7,#33,#5C,#60,#2E,#B1,#39,#B8,#A9,#B7,#2B,#24,#7E,#B2,#A6,#A3,#7D
8,#DE,#5F,#30,#AA,#36,#28,#7B,#AC,#AF,#FC,#BD,#2D,#0F,#8E,#87,#14
9,#95,#09,#1B,#81,#8D,#03,#17,#0C,#11,#8B,#18,#05,#99,#84,#82,#88
+,#9C,#93,#06,#12,#0A,#9A,#1E,#90,#1D,#96,#9F,#35,#B4,#C6,#33,#C5
1,#44,#2E,#B1,#39,#B8,#A9,#B7,#2B,#24,#BE,#B2,#C3,#42,#DD,#41,#5F
2,#30,#AA,#36,#28,#DB,#AC,#AF,#3C,#BD,#2D,#00,#A0,#87,#14,#11,#FF
3,#1B,#81,#8D,#03,#17,#0C,#96,#8B,#18,#05,#99,#84,#82,#88,#9C,#93
4,#06,#12,#0A,#9A,#1E,#90,#1D,#7E,#9F/
      IF (DISPLA.GT.0 .AND. BUS(8).NE.0) THEN
           VALUE = #8D
           RETURN
      END IF
      ROW = (((2*BUS(6)+BUS(5))*2+BUS(10))*2+BUS(2))*2+BUS(1)
      COL = 0
      DO 110 I=#2F,#31
           COL = COL+COL
           IF (R(I).GT.0) COL = COL+1
110   CONTINUE
      COL = COL+1
      IF (COL.EQ.8) THEN
           COL = 7
      ELSE IF (COL.EQ.7) THEN
           COL = 5
      END IF
      VALUE = DTBL(ROW,COL)
      RETURN
      END
      SUBROUTINE COPY
     1     (N, FROM, I, TO, J)
      IMPLICIT INTEGER*2 (A-Z)
      INTEGER*2 FROM(*),TO(*)
      IF (N.GT.0) THEN
           LIM = J*N
```

```
      IF (I.EQ.O) THEN
         DO 100 K=1,LIM,J
100         TO(K) = FROM(1)
      ELSE IF (I.EQ.J) THEN
         DO 110 K=1,LIM,J
110         TO(K) = FROM(K)
      ELSE
         L = 1
         DO 120 K=1,LIM,J
            TO(K) = FROM(L)
120         L = L+I
      END IF
   END IF
   RETURN
   END
   SUBROUTINE OUTLIN(VALUE)
   IMPLICIT INTEGER*2 (A-Z)
   COMMON /LINES/  CTS,BUS(11),POE,CL,IL,KL,OL,RTS,STATE,DATA(8)
   COMMON /TABLES/ R(64),ITBL(9),STBL(9),PTBL(22),CSTBL(4),
  1        BTBL(8)
   COMMON /PARAMS/ LI,LS,PBUS
   EQUIVALENCE (ZPAR,R(#33)), (LEFT,R(#34)), (OPAR,R(#35)),
  1    (BAUD,R(#36)), (RDCNT,R(#1A)),(PDCNT,R(#1B)),(GRAPH,R(#32)),
  2    (CTL,R(#2F)), (SHFT,R(#30)), (NUM,R(#31)), (MODIFY,R(#2C)),
  3    (DISPLA,R(#2D)), (ERR,R(#38)), (CNT,R(#3A)), (ADR,R(#3B)),
  4    (VAL,R(#3C))
   EQUIVALENCE (CSL,BUS(11))
   INTEGER*2 PSN(6),LINES(6)
   EQUIVALENCE (PSN,POE)
   STATE = VALUE
   DO 110 I=1,6
      J = IAND(PSN(I),STATE)
      IF (J.EQ.O) THEN
         LINES(I) = 0
      ELSE
         LINES(I) = 1
      END IF
110 CONTINUE
   WRITE(*,1) LINES
```

```
            RETURN
        1 FORMAT(37X,'Control lines: POE CL IL  K OL RTS'/50X,2I4,4I3)
          END
```

What is claimed is:

1. A data entry system of capable of operating in either a processing state or a watching state comprising:
   a keyboard having a plurality of keys, each capable of being in either a depressed or a released state;
   means for monitoring and detecting the depressed or released state of each of said plurality of keys;
   means responsive to said monitoring and detecting means for causing said dat entry system to enter its watching state from its processing state for a period of predetermined initial duration whenever one of said keys is found to be in its depressed state;
   means for extending said duration of said period each time another one of said plurality of keys becomes depressed, so long as said other key becomes depressed before the expiration of said period and said other key was not previously in its depressed state during said period; and
   means responsive to the expiration of said period for providing a data or control signal corresponding to the key or keys found depressed during said period, independent of when said key or keys were placed in the depressed state, and causing said data entry system to revert to its processing state from which it can again enter the watching state upon detection of a depressed key.

2. A system according to claim 1 comprising a keyboard having a plurality of keys and means for repeatedly providing data or control signals corresponding to individual ones of said keys or a plurality of said keys held in a depressed state for an extended period of time.

3. A system according to claim 2 comprising means for adjusting said predetermined initial duration and said predetermined interval.

4. A system according to claim 1 comprising means for providing a first number of different ones of said data or control signals in response to a second number of keystrokes, wherein said second number of keystrokes is less than twice said first number of data or control signals and wherein each of said keystrokes comprises either the depression of a single one of said keys or a plurality of said keys during said period, or the release of a single one of said keys or a plurality of said keys during a predetermined time interval.

5. A system according to claim 1 comprising means for providing a number of different ones of said data or control signals at an average rate of fewer than two keystrokes per said data or control signal, wherein each of said keystrokes comprises either the depression of a single one of said keys or a plurality of said keys during said period, or the release of a single one of said keys or a plurality of said keys during a predetermined time interval.

6. A system according to claim 1 wherein said keys comprise data keys and control keys and comprising means responsive to a first predetermined control key entry for placing said keyboard in a first operating state, a second occurrence of said predetermined control key entry for placing the keyboard in a second operating state and a third occurrence of said predetermined control key entry for placing the keyboard in a third operating state such that:
   when said keyboard is in its first operating state, a sequence of data key entries will provide signals corresponding to data characters from a first set;
   when said keyboard is in its second operating state, a single occurrence of a data key entry will provide a signal corresponding to a data character from a second set after which said keyboard will revert to its first operating state; and
   when said keyboard is in its third operating state, a sequence of data key entries will provide signals corresponding to data characters from said second set;
   wherein said control key entry is comprised of the depression of a single control key or a plurality of control keys during said period followed by their release, and said data key entry is comprised of the depression of a single data key or a plurality of data keys during said period followed by their release.

7. A system according to claim 2 comprising means for providing said data and control signals serially and in parallel.

* * * * *